United States Patent
Watanabe

(10) Patent No.: US 7,190,472 B2
(45) Date of Patent: Mar. 13, 2007

(54) IMAGE OUTPUT APPARATUS CAPABLE OF SWITCHING STATES, AND IMAGE OUTPUT METHOD, STORAGE MEDIUM AND PROGRAM THEREFORE

(75) Inventor: Osamu Watanabe, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 775 days.

(21) Appl. No.: 10/347,930

(22) Filed: Jan. 22, 2003

(65) Prior Publication Data
US 2003/0142340 A1    Jul. 31, 2003

(30) Foreign Application Priority Data
Jan. 29, 2002   (JP) ............. 2002/020049
Dec. 25, 2002   (JP) ............. 2002/374622

(51) Int. Cl.
*G06K 15/00*   (2006.01)
*G06F 3/12*    (2006.01)

(52) U.S. Cl. .................. 358/1.14; 358/1.13
(58) Field of Classification Search ........ 358/1.1–1.18, 358/502, 503, 504, 530, 402, 420–422, 403, 358/426.05
See application file for complete search history.

(56) References Cited

FOREIGN PATENT DOCUMENTS

| JP | 5-284263 A | 10/1993 |
|----|------------|---------|
| JP | 2000335055 A | * 12/2000 |

\* cited by examiner

*Primary Examiner*—Douglas Q. Tran
(74) *Attorney, Agent, or Firm*—Fitzpatrick, Cella, Harper & Scinto

(57) ABSTRACT

The output method is determined for providing optimal output in order to output image information supplied from the image input unit such as a feeder effectively while taking the states of power supply of the apparatus and the external apparatus into account.

14 Claims, 12 Drawing Sheets

FIG. 3A

| TEMPERATURE OF FIXING ROLLER [°C] | ESTIMATED RESTORING TIME [SECOND] : tc | | |
|---|---|---|---|
| | ENVIRONMENT : BELOW 15°C | ENVIRONMENT : 15-25°C | ENVIRONMENT : OVER 25°C |
| UP TO 15 | 220 | - | - |
| 15-30 | 179 | 170 | 156 |
| 35-50 | 151 | 144 | 132 |
| 50-65 | 127 | 120 | 110 |
| 65-80 | 103 | 98 | 92 |
| 80-95 | 83 | 78 | 74 |
| 95-110 | 64 | 60 | 57 |
| 110-125 | 47 | 44 | 40 |
| 125-140 | 32 | 30 | 27 |
| 140-155 | 19 | 18 | 16 |
| 155-170 | 9 | 8 | 7 |
| 170-185 | 0 | 0 | 0 |

FIG. 3B

| TEMPERATURE OF FIXING ROLLER [°C] | ESTIMATED RESTORING TIME [SECOND] : tc | | |
|---|---|---|---|
| | ENVIRONMENT : BELOW 15°C | ENVIRONMENT : 15-25°C | ENVIRONMENT : OVER 25°C |
| UP TO 15 | 110 | - | - |
| 15-30 | 90 | 85 | 78 |
| 35-50 | 75 | 72 | 66 |
| 50-65 | 63 | 60 | 55 |
| 65-80 | 51 | 49 | 46 |
| 80-95 | 41 | 39 | 37 |
| 95-110 | 32 | 30 | 28 |
| 110-125 | 23 | 22 | 20 |
| 125-140 | 16 | 15 | 13 |
| 140-155 | 10 | 9 | 8 |
| 155-170 | 5 | 4 | 3 |
| 170-185 | 0 | 0 | 0 |

FIG. 12

RECORDING MEDIA SUCH AS FD/CD-ROM

| DIRECTORY INFORMATION |
|---|
| FIRST DATA PROCESSING PROGRAM<br>PROGRAM CODE GROUP CORRESPONDING TO STEPS OF FLOW CHART IN FIG. 4 |
| SECOND DATA PROCESSING PROGRAM<br>PROGRAM CODE GROUP CORRESPONDING TO STEPS OF FLOW CHART IN FIG. 6 |
| THIRD DATA PROCESSING PROGRAM<br>PROGRAM CODE GROUP CORRESPONDING TO STEPS OF FLOW CHART IN FIG. 8 |
| |

MEMORY MAP OF RECORDING MEDIUM

IMAGE OUTPUT APPARATUS CAPABLE OF SWITCHING STATES, AND IMAGE OUTPUT METHOD, STORAGE MEDIUM AND PROGRAM THEREFORE

BACKGROUND OF THE INVENTION

1. Field of the Invention

The present invention relates to an image output apparatus capable of switching between a waiting state in which the apparatus is maintained in a state of being ready to output an image while limiting a part of power supply to an output unit, and a low-power state in which a power supply to the output unit is limited, and to an image output method, a storage medium, and a program therefore.

2. Description of the Related Art

An image output apparatus such as a copying machine in the related art is being developed to a complex machine having a plurality of functions such as facsimile transmission and reception using a scanner or a printer provided in the copying machine, and PDL (Page Description Language) printing in association with recent tendency of digitization.

In contrast to such complexification of the copying machine described above, energy saving when the machine is not in use has been strongly desired as will be seen from the establishment of the Energy Star standard. To cope with such requirement, in the related art, power saving of the apparatus has been promoted by automatically cutting the part of current flow to the units that consume much power in the complex machine, such as a fixing unit, or by cutting the power of the copying machine after a predetermined time has elapsed in a state in which the complex machine is not used.

Generally, in an image output apparatus such as a printer and a copying machine employing an electrophotographic system, for example, a toner image supplied to a photoreceptor drum is transferred onto a recording sheet and then fixed thereon by pressing and heating the recording sheet at a fixing temperature in the order of 170° C. by means of a fixing roller having a heater integrated therein, for example. However, when the surface of the fixing roller is kept at the fixing temperature constantly even after a series of printing procedures has finished in order to be ready for the next printing, much power is consumed for nothing.

Therefore, the image output apparatus is adapted to be migrated to a low-power mode that saves energy in the apparatus by reducing the amount of power supply to the heater to keep the fixing roller at around 60° C., or suspending the power supply to the heater when a state in which no printing job is performed in each image output apparatus is continued for a predetermined time period (one minute, for example).

The mode to be ready for performing the printing job immediately as described above is referred to as "waiting mode", the mode in which the amount of power supply is reduced in a state in which no printing job is performed as described above is referred to as "low-power mode", the mode in which no power is supplied is referred to as "off-mode", and the time period required for recovering from the low-power mode or from the off-mode to the waiting mode is referred to as "recovery time".

On the other hand, as one of the printing systems utilizing the conventionally known image output apparatus, a technique for supplying an image scanned by the scanner positioned remotely from the image output apparatus to an image output apparatus that can start image forming in a shortest time period as disclosed in Japanese Patent Laid-Open No. 5-284263 is known.

However, in the invention disposed in the Japanese Patent Laid-Open No. 5-284263, how to select any one of image output apparatus on the network is settled, but there is room for improvement in effective output of images read by a feeder in the mainframe of the copying machine.

SUMMARY OF THE INVENTION

In view of such problems, it is an object of the present invention to provide a control mechanism to output image information supplied by an image input unit such as a feeder effectively in an environment in which power saving is achieved.

In the environment in which power saving is achieved, in order to output image information supplied by the image input unit such as the feeder effectively, the invention provides an image output apparatus capable of utilizing the input unit for inputting an image of manuscript and being connected to an external image output apparatus, including an output unit for outputting image information, determination unit for determining an output method based on a power supply state of an output unit of the external image output apparatus and a power supply state of the output unit in the image output apparatus, wherein the output unit outputs image information based on the output method determined by the determination unit.

Further objects, features and advantages of the present invention will become apparent from the following description of the preferred embodiments (with reference to the attached drawings).

BRIEF DESCRIPTION OF THE DRAWINGS

FIGS. 3A and 3B are drawings showing examples of LUT for specification information on a printer units stored and controlled in control units shown in FIG. 1.

FIG. 12 is an explanatory drawing showing a memory map of a storage medium for storing various data processing programs that can be read by a printing system to which the image output apparatus and the device management apparatus according to the invention may be applied.

DESCRIPTION OF THE PREFERRED EMBODIMENTS

Figure 1:
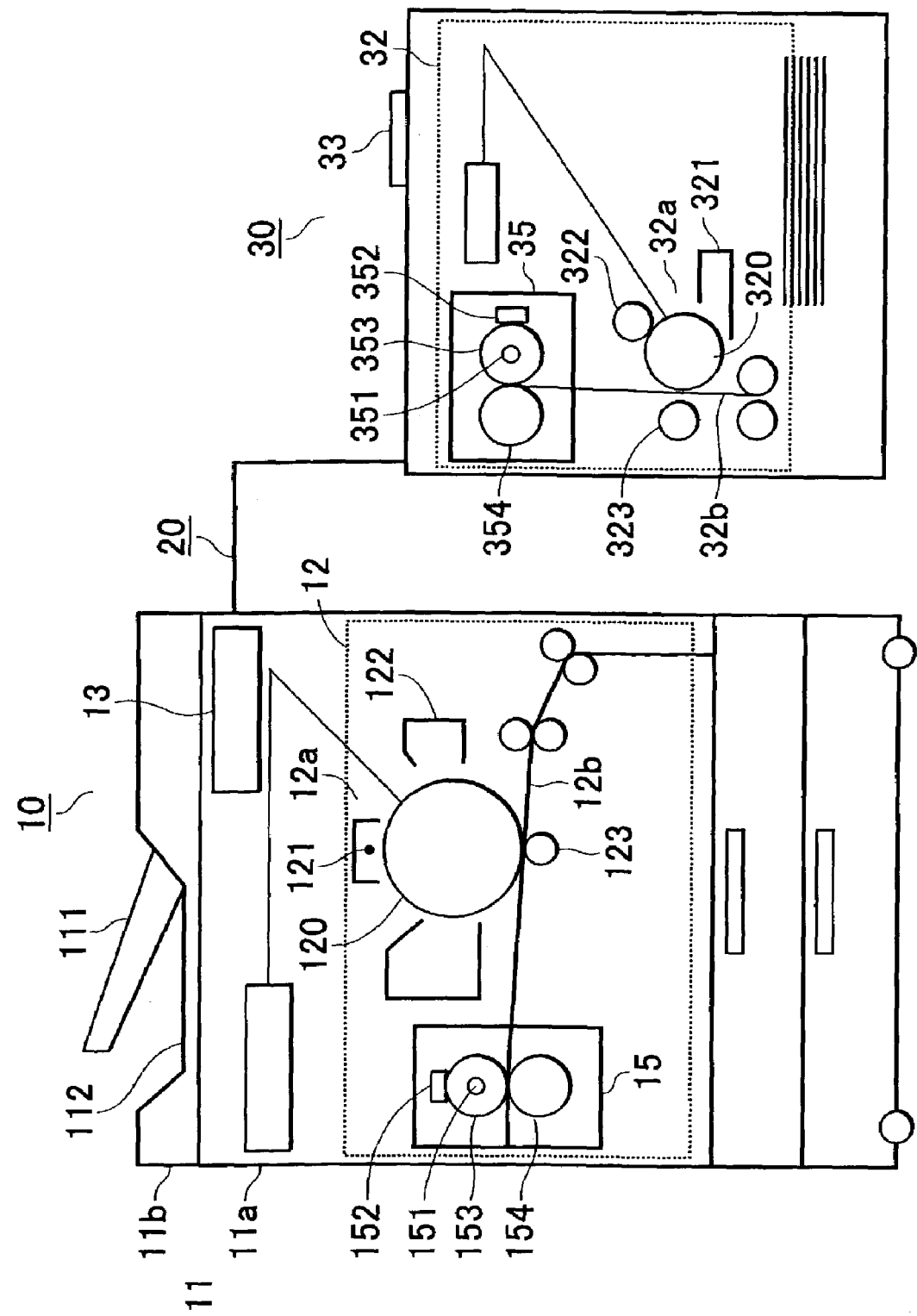
FIG. 1 is a general cross section showing an entire construction of the image system to which a device management apparatus according to the invention may be applied.
Figure 2:
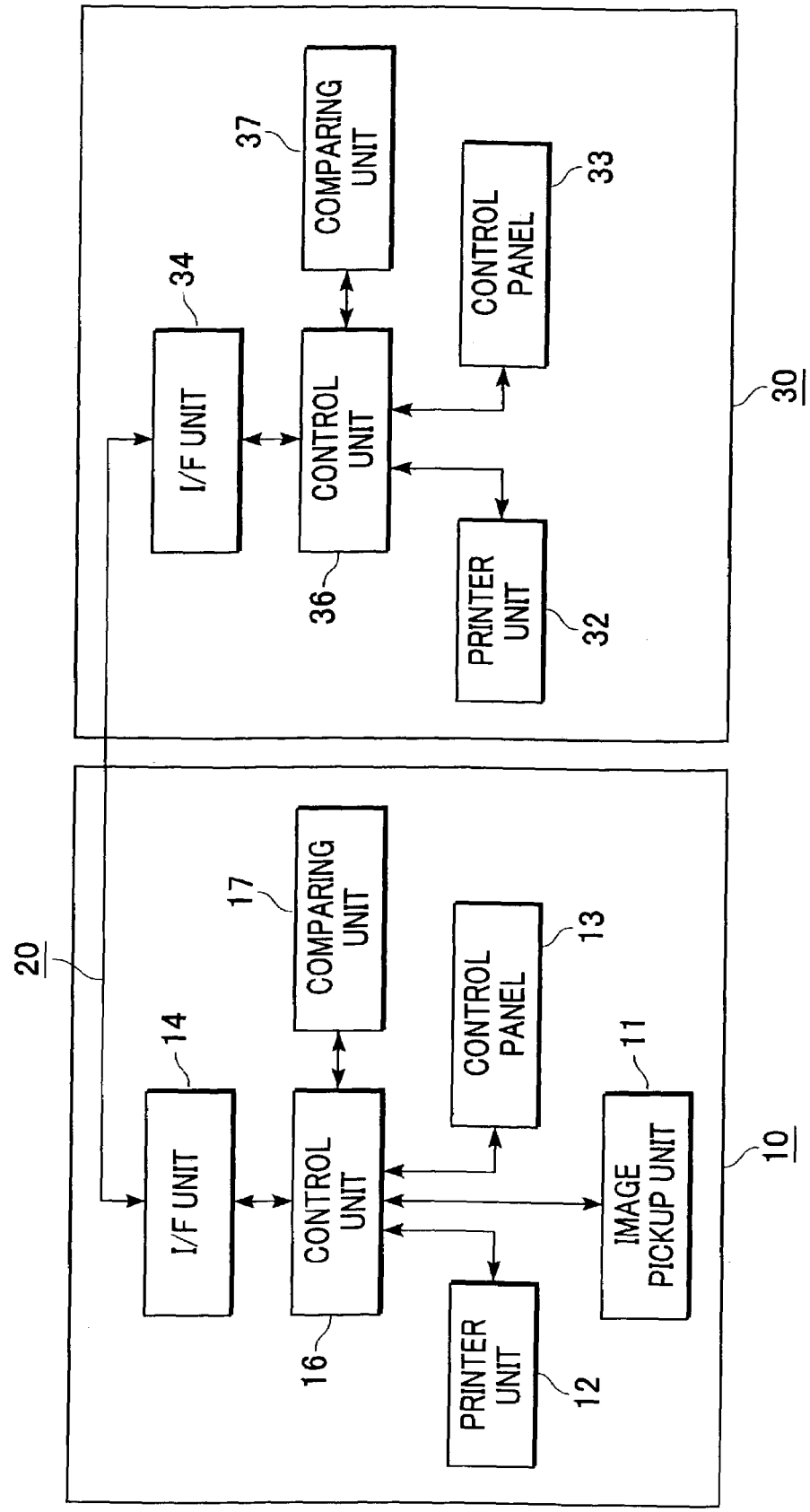
FIG. 2 is a block diagram showing an electrical construction of a copying machine and a printer shown in FIG. 1.

Referring now to FIG. 1 to FIG. 3, an embodiment of the image system to which an device management apparatus according to the invention may be applied will be described taking an image output system constructed of a single general digital copying machine (hereinafter referred to simply as "copying machine") and a single laser printer (hereinafter referred to simply as "printer") as an example.

FIG. 1 is a general cross section showing an entire construction of the image system to which a device management apparatus according to the invention may be applied, including a digital copying machine 10, and a printer 30 connected to the digital copying machine 10 so as to be communicable therewith via a cable 20.

The copying machine 10 includes an image pickup unit 11 for reading a manuscript image and a printer unit 12 for reproducing an image read by the image pickup unit 11 on a recording sheet by an electrostatic copying system.

The image pickup unit 11 includes a scanner 11a for optically reading a manuscript image placed on a platen (not shown in the figure), and an automatic manuscript carrier unit 11b provided on top of the scanner 11a so as to be capable of opening and closing toward the rear for automatically carrying a manuscript set thereon in the closed state one by one onto the platen. The automatic manuscript carrier unit 11b feeds the manuscript set on a manuscript feeding tray 111 via a manuscript feeding roller one by one, carries the fed manuscript to a reading position on the platen glass via a manuscript conveyer belt, discharges the read manuscript to a manuscript discharge tray 112 again via the conveyer belt, and continues the automatic feeding operation until the manuscripts set on the manuscript feeding tray 111. The scanner 11a includes an exposure lamp for linearly irradiating the manuscript, a slider for moving the exposure lamp in the sub-scanning direction, and a CCD sensor for receiving a reflected light from the manuscript.

The image of the manuscript irradiated by the exposure lamp is photoelectrically converted into electric signals by the CCD sensor and sent to a control unit 16 (See FIG. 2), stored once in an image memory disposed in the control unit 16, which is read out when necessary and fed as laser diode driving signals of printer unit 12.

The printer unit 12 includes a photoreceptor drum 120 as a main component, an exposure unit for exposing and scanning the surface thereof, an image forming unit 12a for visualizing and reproducing the exposed image on a recording sheet, a carrier unit 12b, and a fixing unit 15. The exposure unit modulates a light beam emitted from the laser diode by driving signals issued from the control unit 16. The emitted light beam is polarized by being reflected by a mirror surface of a polygon mirror rotated at a constant speed, and exposes and scans the surface of the photoreceptor dram 120.

The image forming unit 12a including an electrostatic charger 121 disposed around the photoreceptor drum 120, a developer 122, and a transfer roller 123, forms a toner image on the surface of the photoreceptor drum 120 by the known electrophotographic technology, and transfers the formed toner image onto the recording sheet carried from a sheet feeding tray or a manual sheet feeding tray via the carrier unit 12b. The recording sheet with the toner image transferred thereon is carried to the fixing unit 15, where the toner is fixed by being heated and pressed by a fixing roller 153 having a heater 151 therein and maintained at a constant temperature by a thermistor 152 and a pressing roller 154.

A control panel 13 controlled by an operator for setting various printing modes is provided on top of the scanner 11a on the near side at an easily accessible position, and the control panel 13 includes a ten-key for entering the number of sets to be printed or setting printing ratio, a start key for starting the printing job, and a display window for displaying the printing mode which is set.

The printer 30 includes a printer unit 32 having the same construction as the printer unit 12 of the copying machine 10. The printer unit 32 includes a photoreceptor drum 320 as a main component, an exposing unit for exposing and scanning the surface of the photoreceptor drum 320, an image forming unit 32a for visualizing the exposed image and reproduce it on a recording sheet, a carrier unit 32b, and a fixing unit 35.

The exposure unit receives the manuscript image stored in the image memory of the copying machine 10 via the cable 20, and modulates a light beam emitted from the laser diode by driving signals issued from a control unit 36 (See FIG. 2). The light beam is polarized by being reflected from the mirror surface of the polygon mirror rotated at a constant speed, and exposes and scans the surface of the photoreceptor drum 320. The image forming unit 32a including an electrostatic roller 322 disposed around the photoreceptor drum 320, a developer 321, and an transfer roller 323, forms a toner image on the surface of the photoreceptor drum 320 by the known electrophotographic technology, and transfers the formed toner image onto the recording sheet carried from a sheet feeding tray or a manual sheet feeding tray via the carrier unit 32b.

The recording sheet with the toner image transferred thereon is carried to a fixing unit 35, where the toner is fixed by being heated and pressed by a fixing roller 353 having a heater 351 therein and regulated in temperature by a thermistor 352 and a pressing roller 354.

A control panel 33 controlled by an operator for setting various printing modes is provided on top of the printer unit 32 on the near side at an easily accessible position, and the control panel 33 includes an online key for switching between an online state in which reception of image data is enabled and an off-line state in which reception of image data is disabled, a test printing key for performing test printing in the off-line state, and a display window for displaying the printing mode which is set.

FIG. 2 is a block diagram showing an electrical construction of the copying machine 10 and the printer 30 shown in FIG. 1, and the same components as in FIG. 1 are represented by the same numerals.

In FIG. 2, the copying machine 10 includes the control unit 16 as a main component. The control unit 16 is connected to an I/F unit 14 for communicating with the printer 30, and a comparing unit 17 for comparing the recovery time between the copying machine 10 and the printer 30 as well as to the image pickup unit 11, the printer unit 12, and control panel 13.

FIGS. 3A and 3B are drawings showing examples of the LUT for specification information on the printer units stored and controlled in control unit 16 shown in FIG. 2. FIG. 3A is the LUT for specification information on the printer unit 12 shown in FIG. 2, and FIG. 3B is the LUT for specification information on the printer unit 32 shown in FIG. 2.

The control unit 16 of the copying machine 10 includes the CPU, a ROM for storing programs relating to migration to the low-power mode and recovery from the low-power mode to the waiting mode, control programs relating to scanning, image formation, communication, data of the LUT showing the relation between environmental information such as temperatures of the fixing roller 153 detected by the thermistor 152 in the copying machine 10 and the recovery time required for recovery from the low-power mode to the waiting mode as shown in FIG. 3A (for example, when the ambient temperature is 20° C., if the detected temperature is 130° C., the recovery time is 30 seconds), and display data to be displayed on the display window on the control panel 13, a RAM backed up by a battery for providing a work area for storing mode flags indicating if the copying machine 10 is currently in the low-power mode or in the waiting mode, instructions from the operator provided when executing programs, and the operational condition of each unit in the apparatus, a timer for measuring various time periods such as the system time or the recovery time, and an image memory for temporary storing image data read by the image pickup unit 11.

The control unit 16 receives various key-in data supplied from the ten-key and the print key on the control panel 13 and issues driving signals to a motor, a solenoid, and a charger of the image pickup unit 11 or the printer unit 12 upon execution of the program by the internal CPU, and receives state signals from various sensors and performs uniform control while adjusting timings of image pickup operation and image forming operation based on the detected outputs from the various sensors, so that smooth copying operation may be achieved.

The printer 30 includes the control unit 36 as a main component, and the control unit 36 is connected to an I/F unit 34 for communicating with the copying unit 10 as well as the printer unit 32 and the control panel 33.

The control unit 36 of the printer 30 includes the CPU, a ROM for storing programs relating to migration to the low-power mode and recovery from the low-power mode to the waiting mode, control programs relating to image formation and communication, data showing the relation between temperatures of the fixing roller 353 detected by the thermistor 352 in the printer 30 and the recovery time required for recovery from the low-power mode to the waiting mode as shown in FIG. 3B (for example, when the ambient temperature is 20° C., if the detected temperature is 130° C., the recovery time is 15 seconds), and display data to be displayed on the display window on the control panel 33, a RAM backed up by a battery for providing a work area for storing mode flags indicating if the printer 30 is currently in the low-power mode or in the waiting mode, instructions from the operator provided when executing programs, and the operational condition of each unit in the apparatus, a timer for measuring various time periods such as the system time or the recovery time, and an image memory for temporary storing image data received from the copying machine 10.

The control unit 36 receives various key-in data supplied from various keys on the control panel 33 such as the online key and a printing command from the copying machine 10, issues driving signals to a motor, a solenoid, and a charger of the printer unit 32 upon execution of the program by the internal CPU, and receives state signals from various sensors and performs uniform control while adjusting timings of image pickup operation based on the detected outputs from the various sensors, so that smooth printing job may be achieved.

The control units 16 and 36 monitor temperatures of the fixing rollers of the printer units 12 and 32 in the low-power mode detected by the thermistors 152 and 352 shown in FIG. 2, respectively, estimate the recovery time to the waiting mode from the LUTs in FIGS. 3A and 3B showing the relation with respect to the estimated recovery time, and determines whether the printing job is performed by the copying machine 10 or by the printer 30 based on the result of comparison of the estimated recovery time between the copying machine 10 and the printer 30.

[First Embodiment]

[Control Action of the Control Units 16 and 36]

The control action of the control units 16, 36 will now be described in detail.

In this embodiment, the printer selecting process in a case where the copying machine 10 is turned on will be described.

When the copying machine 10 is turned on, a main routine (not shown in the figure) is activated, and the respective CPUs of the control unit 16 read out an initial program stored in the ROM, perform an initial setting such as initialization of the work area of the RAM, start time keeping by an internal timer, and monitor so that the main routine finished in the predetermined time.

After the time keeping by the internal timer has started, a panel I/O process for receiving various key-in operation via the control panel 13 and displaying the input information on the display window, a data communication process for inter-communicating image data and data representing various states, a printer selecting process for determining whether image output is performed by the printer unit 12 of the copying machine 10 or by the printer unit 32 of the printer 30, a printing process for printing based on the print mode preset by the selected device, and other processes other than those described above are performed sequentially and repeatedly.

Since the panel I/O process, the printing process, and other processes are publicly known that are generally performed in association with the printing job or the communicating operation, the existing technology may be used. Therefore, the printer selecting process that is specific in the embodiment of the invention will be described in detail.

Figure 4:
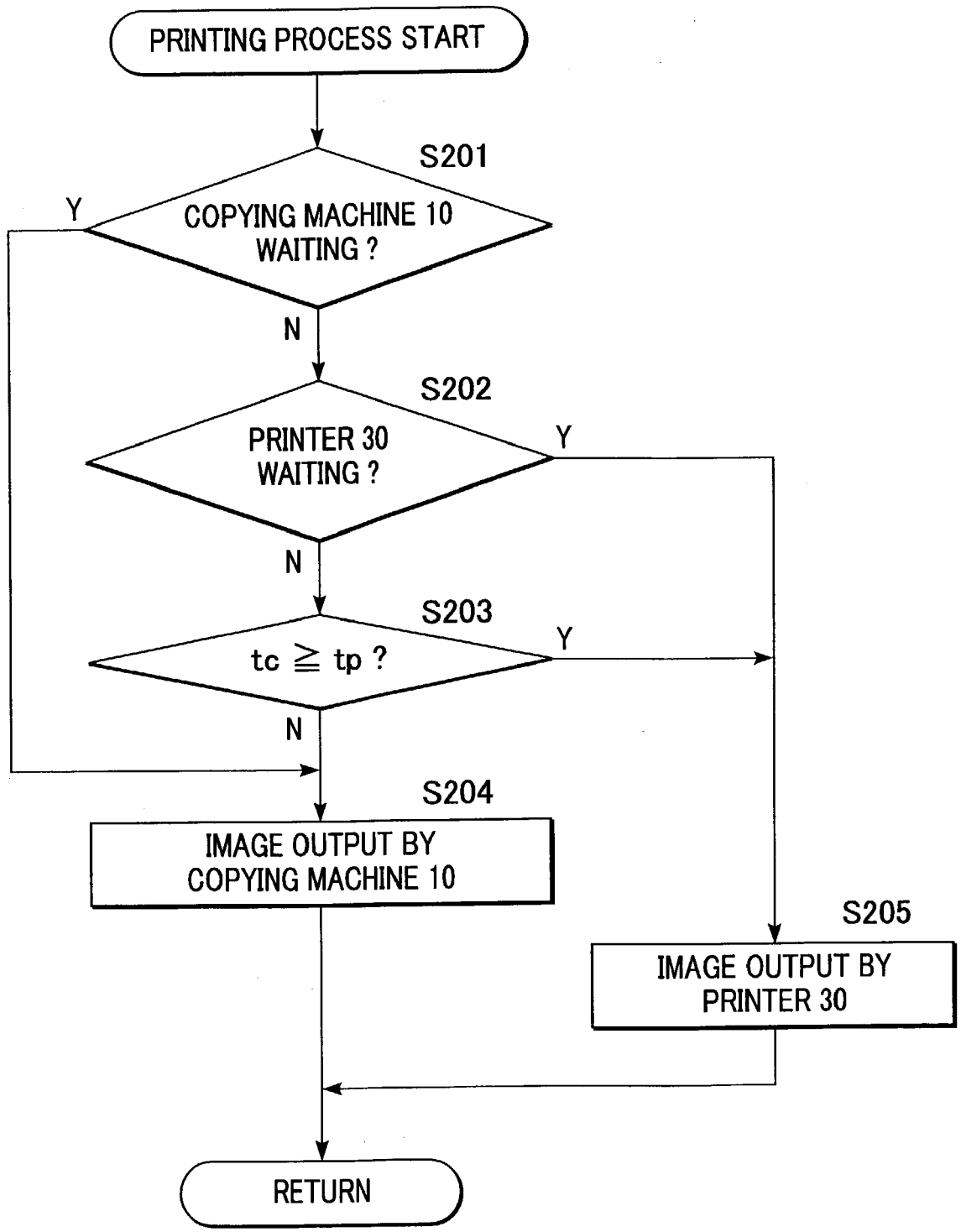
FIG. 4 is a flow chart showing an example of data processing procedure in an image output apparatus according to the invention.

FIG. 4 is a flow chart showing an example of data processing procedure in the image output apparatus according to the invention, which corresponds to the sub routine of the printer selecting process made by the control unit 16 of the copying machine 10 as an image output apparatus or by the control unit 36 of the printer 30. The reference numerals S201 to S205 represent the steps.

The control unit 16 read a mode flag of the copying machine 10 itself, and determines whether or not the copying machine 10 is in the waiting mode or not (Step S201). When the control unit 16 determined that the copying machine 10 is in the waiting mode, the printing process in which the printer unit 12 of the copying machine 10 performs the printing job is started (Step S204).

On the other hand, when the control unit 16 determined that the copying machine 10 is not in the waiting mode, the control unit 16 reads the mode flag of the printer 30 on the control unit 36 via the cable 20, and determines whether or not the printer 30 is in the waiting mode (Step S202). When the control unit 16 determines that the printer 30 is in the waiting mode, the control unit 16 migrates to the printing process by the printer 30 (Step S205), and returns to the main routine.

As a consequence, since only the printer 30 is maintained in the waiting mode without allowing the copying machine 10 to migrate into the waiting mode, when the operator wants to start printing, the printer unit 32 is capable of starting printing job immediately by feeding the image read by the image pickup unit 11 to the printer 30 without waiting for warming up of the printer unit 32, and thus the operating efficiency of the printing job improves. In addition, since a power required for migration to the waiting mode is not consumed in the copying machine 10, the energy-saving effect in the entire system may be maximized.

On the other hand, if NO in Step S202, or if the control unit 16 determined that both of the copying machine 10 and the printer 30 are not in the waiting mode, the control unit 16 reads the estimated recovering time (tc) until the copying machine 10 migrates to the waiting mode from the reading of the thermistor 152 and the environmental temperature.

Then, the control unit 16 sends inquiry to the control unit 36 concerning the estimated recovery time (tp) until the printer 30 migrates to the waiting mode, which may be obtained from the reading of the thermistor 352 and the environmental temperature. Subsequently, the comparing unit 15 reads the estimated recovery times for both of the copying machine 10 and the printer 30 connected thereto, compares both values (Step S203), and notifies the compared result to the control unit 16.

When it is determined that the estimated recovery time of the copying machine 10 is longer than the estimated recovery time of the printer 30 as a result of the comparison, the control unit 16 migrates the printing process to the printer 30 (Step S205), and returns to the main routine.

On the other hand, when it is determined that the estimated recovery time of the copying machine 10 is shorter than the estimated recovery time of the printer 30, the control unit 16 migrates the printing process to the copying machine 10 (Step S204), and returns to the main routine.

As a consequence, the output operation may be made based on the output method determined by the state of power supply of the output unit of the external image output apparatus (printer 30) and the state of power supply of the output unit of the apparatus. Therefore, only one of the copying machine 10 and the printer 30 which is shorter in the recovery time is migrated to the waiting mode, and the other one is turned off or controlled to the low-power mode, a constant degree of energy saving is achieved.

While electricity may be saved by repeating such procedures, the printing job may be started immediately without waiting for the machine to be warmed up when wanting to print since one of the copying machine 10 and the printer 30 is maintained in the waiting mode.

Although only the case in which the copying machine 10 is actuated is shown in this embodiment for the sake of clarification, the same construction may be employed by using the control unit 36 and a comparing unit 37 of the printer 30 in the case where the printer 30 is actuated.

Although the action when the copying machine is turned on is described in this embodiment, the same construction may be employed also when it is recovered from the low-power mode.

[Second Embodiment]

Figure 5:
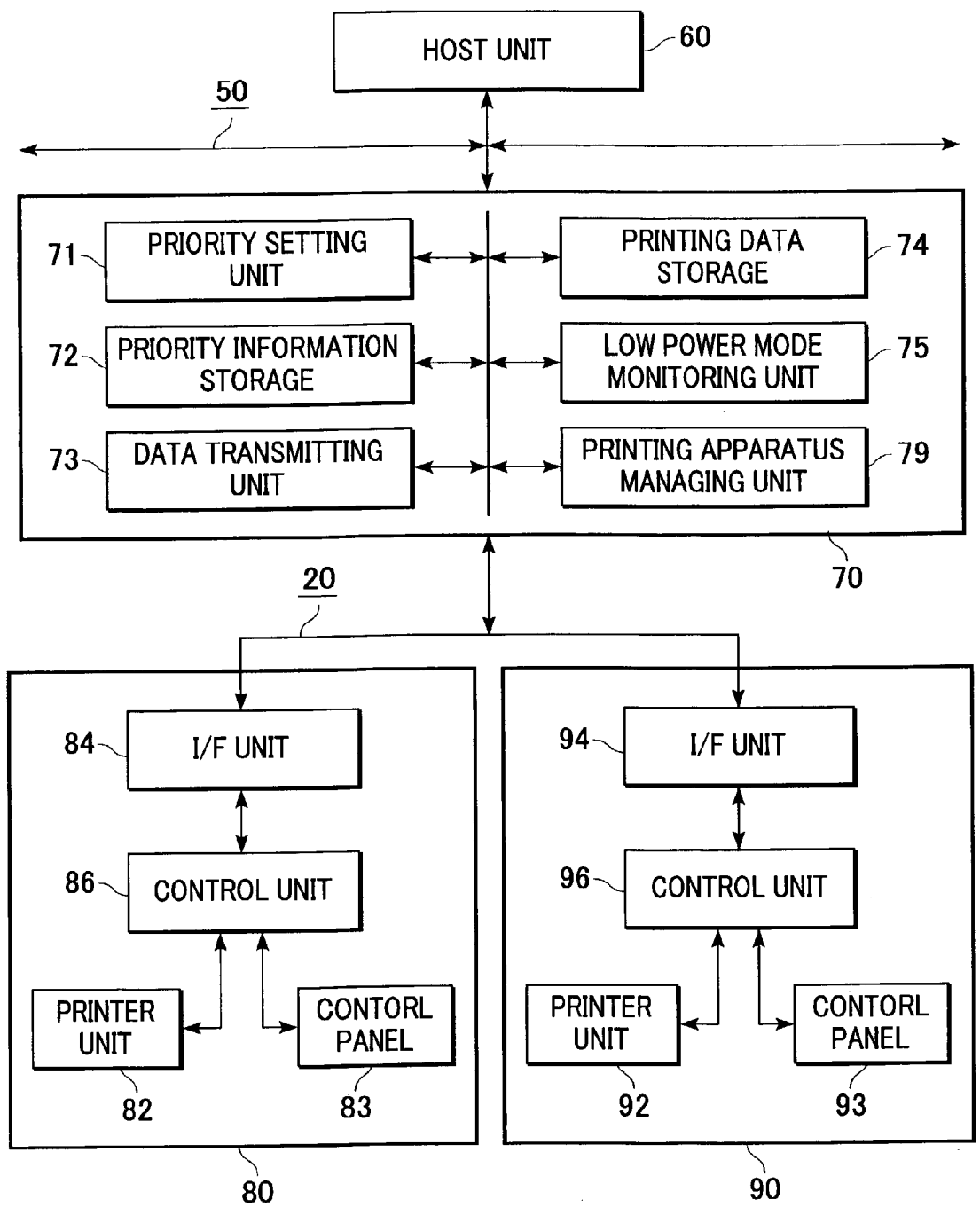
FIG. 5 is a block diagram showing an entire construction of an image output system to which the device management apparatus according to a second embodiment of the invention may be applied.
Figure 6:
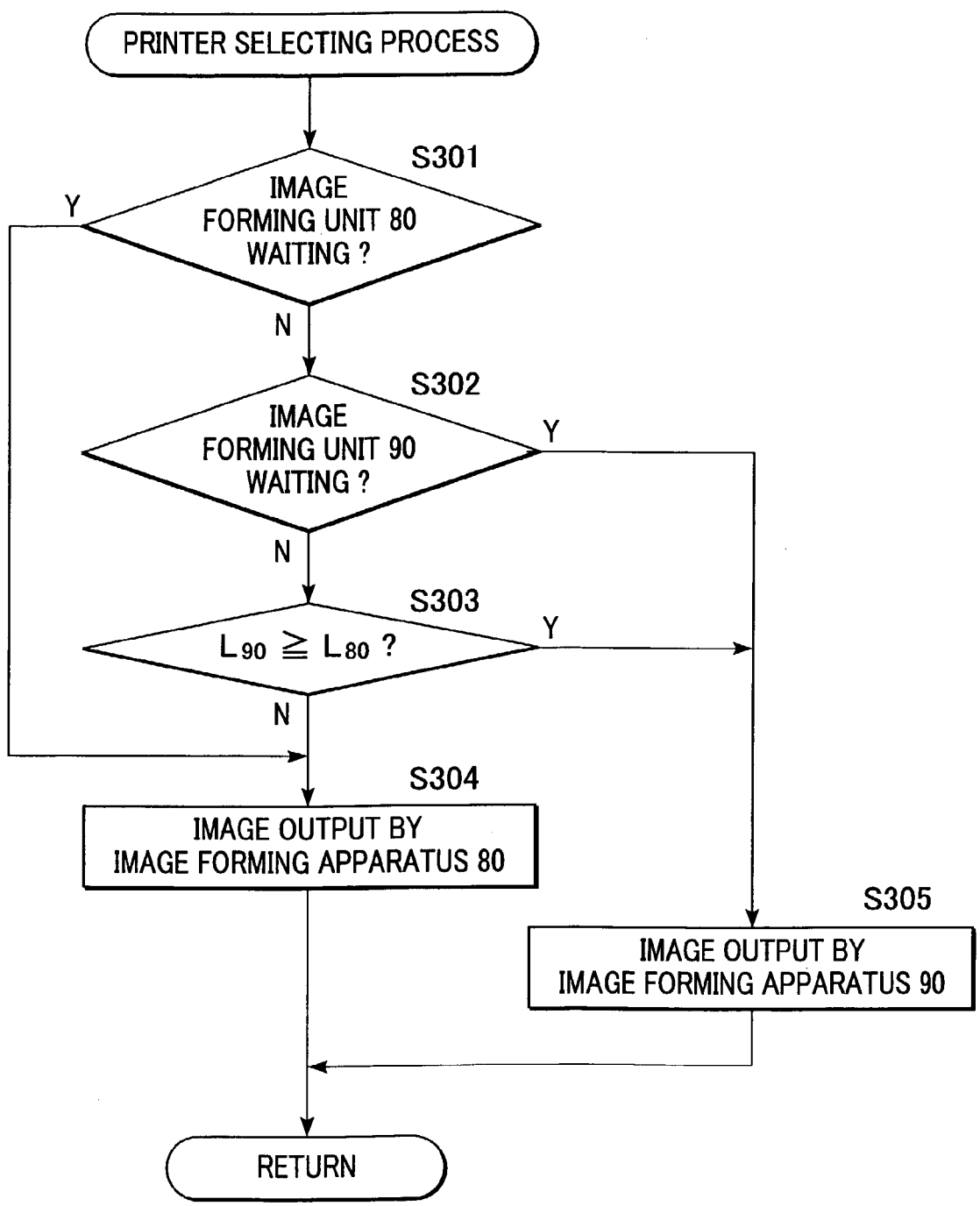
FIG. 6 is a flow chart showing an example of a first data processing procedure in the device management apparatus according to the invention.

Referring now to FIG. 5 and FIG. 6, the second embodiment will be described. The same components in these figures as those described above are represented by the same reference numerals, and the description will not be made.

FIG. 5 is a block diagram showing a general construction of the image output system to which the device management apparatus according to the second embodiment of the invention may be applied. The image output system includes a host unit 60, a printing job management apparatus 70, an image output apparatus 80 such as a printer, and an image output apparatus 90, and the host unit 60 and the printing job management apparatus 70 are connected via a network 50.

The host unit 60 is connected under the network environment, and is provided with a data input unit such as a keyboard and a liquid crystal display (not shown in the figure). The host unit 60 includes a function of a word processor, so that the operator can make a sentence by entering the data.

In FIG. 5, the printing job management system 70 is connected to the host unit 60 via the network 50, to the image output apparatus 80 and the image output apparatus 90, is able to transmit data with the host unit 60 or with the image output apparatus 80 and the image output apparatus 90 or to store data temporarily, and monitors the states of a plurality of numbers of image output apparatus constantly.

The printing job management apparatus 70 includes a priority setting unit 71, a priority information storage 72, a data transmitting unit 73, a printing data storage 74, and a low-power mode monitoring unit 75.

The low-power mode monitoring unit 75 monitors the power level of each of the networked image output apparatus 80 and 90 at the waiting mode and at the low-power mode on a steady basis. The power level of each image output apparatus 80 and 90 may be set to 80%, 50%, and 30% with respect to the power in the waiting state depending on the degree of energy saving required.

The priority setting unit 71 sets the priority of the printer to be used based on information such as whether or not the image output apparatus to be connected is in the waiting mode, or how much is the power level in the low-power mode.

The priority information storage 72 stores priority information set by the priority setting unit 71. The data transmitting unit 73 receives the printing data transmitted from the host unit 60 and transmits such printing data to the image output apparatus to be connected. The printing data storage 74 stores printing data received by the data transmitting unit 73, and read out and transmits printing data stored in the printing data storage 74 when transmitting such printing data from the data transmitting unit 73 to the image output apparatus 80 and the image output apparatus 90.

The image output apparatus 80 includes a control unit 86, a printer unit 82, a control panel 83, and an I/F unit 84, and prints image data such as a sentence transmitted via the printing job management apparatus 70 on the output medium such as a recording sheet based on printing data information.

The image output apparatus 90 includes a control unit 96 and an I/F unit 94, and the respective functions are the same as those of the image output apparatus 80, and the same action is made.

Subsequently, the control action of the printing job management apparatus 70 will be described. In this embodiment, the printer selection process that the printing job management apparatus 70 performs when printing image data from the host unit 60 will be described.

FIG. 6 is a flow chart showing an example of the first data processing procedure in the network device management apparatus according to the invention, showing the procedure of the printer selecting process performed by the printing job management apparatus 70 shown in FIG. 5. The reference numerals S301 to S305 represent the respective steps.

The printing job management apparatus 70 determines if there is an image output apparatus in the waiting mode (S301, S302). If it is found that there is an image output apparatus in the waiting mode in either one of the steps, it selects the image output apparatus in the waiting mode to allow it to perform image output (S304, S305), and returns the process.

On the other hand, if NO in Step S302, or if it is determined that there is no image output apparatus in the waiting state in the network, the printing job management apparatus 70 compares the power levels (L80, L90) of the image output apparatus 80 and the image output apparatus 90, determines whether or not the power level of the image output apparatus 90 is higher than the power level of the image output apparatus 80 (S303), and if YES selects the image output apparatus 90 whereof the power level is higher for outputting the image (S305), returns the process. If not, the printing job management apparatus 70 selects the image output apparatus 80 whereof the power level is higher for outputting the image (S304), and returns the process.

Accordingly, the image output apparatus whereof the power priority is high is selected for image output based on the comparison of the power level on a steady basis. Since the apparatus with higher power level in the low-power state requires shorter recovery time to the waiting mode, the operating efficiency improves.

[Third Embodiment]

Figure 7:
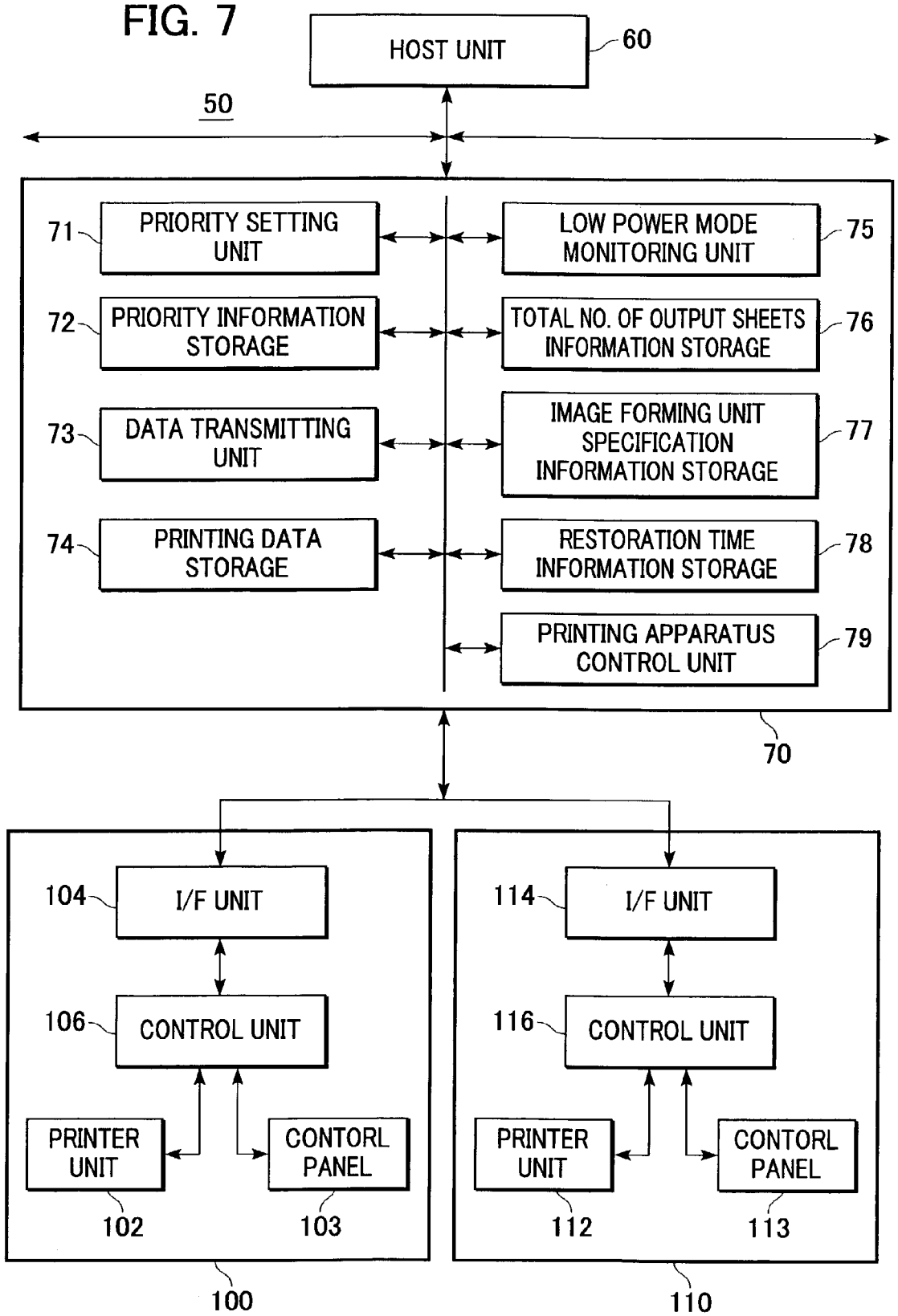
FIG. 7 is a block diagram showing an entire construction of an image output system to which the device management apparatus according the third embodiment of the invention may be applied.
Figure 8:
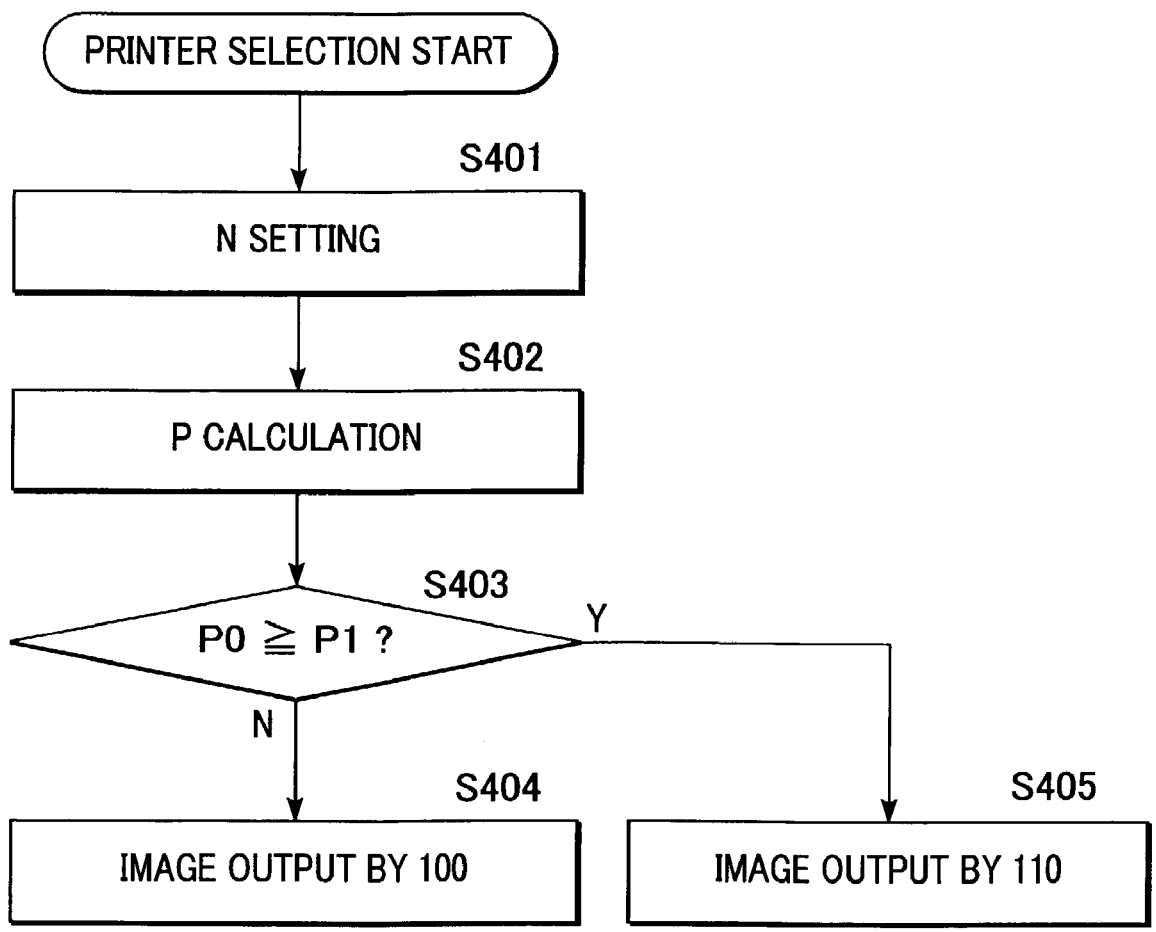
FIG. 8 is a flow chart showing an example of a second data processing procedure in the device management apparatus according to the invention.

Referring now to FIG. 7 and FIG. 8, the third embodiment will be described.

FIG. 7 is a block diagram showing a general construction of the image output system to which the device management apparatus according to the third embodiment of the invention may be applied. The image output system includes the host unit 60, the printing job management apparatus 70, an image output apparatus 100 and an image output apparatus 110 such as a printer. The host unit 60 and the printing job management apparatus 70 are connected by the network 50.

The printing job management apparatus 70 is also connected to the image output apparatus 100 and the image output apparatus 110, and is capable of data transmission with the host unit 60 or with the image output apparatus 100 and the image output apparatus 110, or of temporary data storage, and monitors the state of the plurality of numbers of image output apparatus on a steady basis.

In FIG. 7, the printing job management apparatus 70 includes the priority setting unit 71, the priority information storage 72, the data transmitting unit 73, the printing data storage 74, the low-power mode monitoring unit 75, an in-job total output sheet quantity information storage 76, an image output apparatus specification information storage 77, a recovery time information storage 78, and a printing apparatus managing unit 79.

The priority setting unit 71 sets the priority parameter from each image output apparatus to be connected, and set the priority of the printer that performs the printing job. The priority information storage 72 stores information of the priority set by the priority setting unit 71. The data transmitting unit 73 receives printing data transmitted from the host unit 60, and transmits received printing data to the image output apparatus to be connected. The printing data storage 74 stores printing data received by the data transmitting unit 73, and reads and transmits printing data stored in the printing data storage 74 when transmitting from the data transmitting unit 73 to the image output apparatus 100, 110.

The low-power mode monitoring unit 75 monitors the waiting mode and the low-power state of each of the image output apparatus 100 and 110 on a steady basis. The in-job total output sheet quantity information storage 76 stores information on the number N of sheet output in a certain job transmitted form the network equipment such as the host unit 60.

The image output apparatus specification information storage 77 stores data such as a throughput n (number of sheets that can be output per minute) of each of the image output apparatus 100 and 110 connected in the network. The recovery time information storage 78 stores data on the recovery time of each image output apparatus 100 and 110 transmitted from each image output apparatus and estimated from the temperature of the fixing roller.

The image output apparatus 100 includes a control unit 106, a printer unit 102, a control panel 103, and a I/F unit 104, and image data such as a sentence transmitted via the printing job management apparatus 70 on the output medium such a recording sheet based on printing data information. The throughput of the image output apparatus 100 is n0 (sheets/minute). The time required to return to the waiting mode is t0 (minutes) based on the temperature of the fixing roller of the image output apparatus 100.

The image output apparatus 110 includes a control unit 116 and an I/F unit 114. The throughput of the image output apparatus 110 is n1 (sheets/minute). The time required to return to the waiting mode is t1 (minute) based on the temperature of the fixing roller of the image output apparatus 110.

It is assumed that n0 is larger than n1 (N0>n1) for the sake of convenience. When it is already in the waiting mode, t0=0, t1=0.

Subsequently, the control action of the printing job management apparatus 70 will be described. In this embodiment, the printer selecting process that is performed by the printing job management apparatus 70 when printing image data from the host unit 60 will be described.

The printer selecting process in the printing job management apparatus 70 is described by the flow chart in FIG. 8.

FIG. 8 is a flow chart showing an example of the second data processing procedure in the device management apparatus of the invention, showing the procedure of the printer selecting process in the printing job management apparatus 70. The reference numeral S401 to S405 represents the respective steps.

In a first place, the total number of sheets to be printed N in one job, which is set on the host side when setting the printing job, is stored in the in-job total output sheet quantity information storage 76.

Then, a priority parameter P is calculated from data n and t stored in the specification information storage 77 and the recovery time information storage 78 of the image output apparatus and from the above described N (S402).

The parameters P relating to the image output apparatus 100 and the image output apparatus 110 are represented by the following equations: $P0=t0+N/n0$, $P1=t1+N/n1$. The printing job management apparatus 70 compares a priority parameter P0 and a priority parameter P1 (S403), and when it is determined that the priority parameter P0 is larger than the priority parameter P1, the image output apparatus 110 outputs the image and returns the process in Step S405.

On the other hand, when it is determined that the priority parameter P0 is smaller than the priority parameter P1 in Step S403, the image output apparatus 100 outputs the image and returns the process in step S404.

Accordingly, the printing job management apparatus 70 compares the priority parameter P0 and the priority parameter P1, and gives priority to the image output apparatus having smaller parameter, and selects the printer. Therefore, the printer selection may be done effectively depending on the total number of sheets to be printed. For example, when the number of sheets to be printed is small, the image output apparatus whereof the recovery time is short may be selected, and thus usability is improved and the quantity of power consumption may be reduced.

In addition, since the job may be completed in a short time when many numbers of sheets are to be printed, energy saving in the entire system is achieved as a consequence.

According to this embodiment, the image output apparatus whereof the time required for migration from the low-power state to the waiting state is shorter is given the priority when selecting the image output apparatus, and thus the power required for recovery may be reduced and the power saving of the entire system is achieved.

[Fourth Embodiment]

In the fourth embodiment, a mechanism having a further developed function in addition to the functions in the first to third embodiments will be described. The basic constructions and functions of the copying machine, the printer, the printing job management apparatus, and the image output apparatus are the same as the preceding embodiments.

Figure 9:
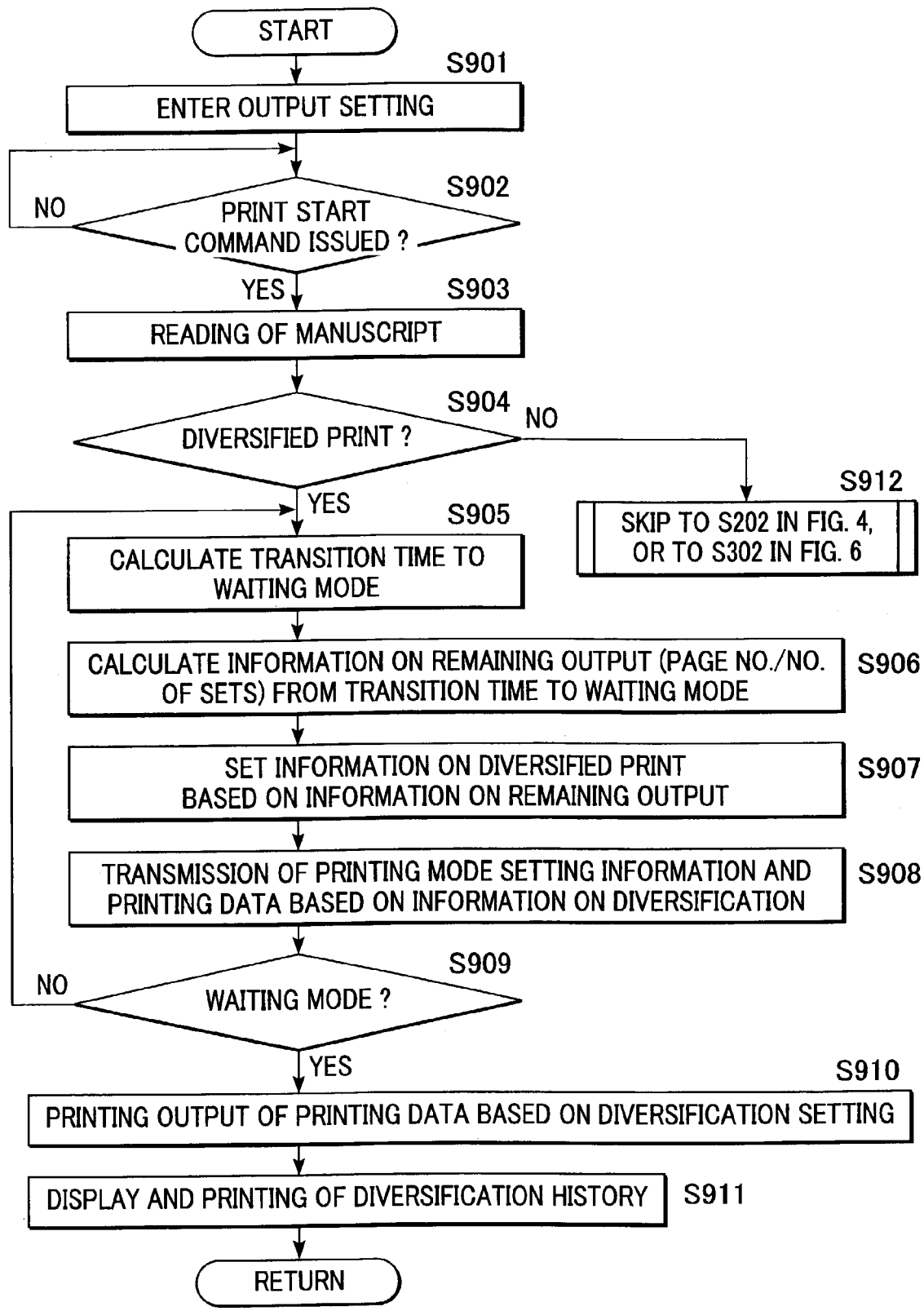
FIG. 9 is a flow chart showing an example of the data processing procedure of an image output apparatus according to the invention.

FIG. 9 is a flow chart showing a process in the apparatus to which printing data is entered, which is achieved by the CPU (Central Processing Unit) provided in the apparatus by performing a process based on the program stored in non-volatile storage means (such as a hard disk or the ROM). The apparatus assumed here may be, for example, a digital complex machine having a copying function. For example, the coping machine 10 (digital copying machine) and the printer 30 in FIG. 2 in the first embodiment may be applied, and the following description will be made as the process of the copying machine 10 and the printer 30.

In Step S901, the output setting is entered. For example, input via the control panel provided on the mainframe of the apparatus, such as the control panels 13, 33 in FIG. 2 is assumable.

The output setting in Step S901 may include the number of sets, instruction of stapling, double-sided printing or not, layout information such as 2 in 1.

In Step S902, whether or not instruction to start output is issued is determined. Instruction to start output includes instruction to start copying via the control panel, and in this case, a manuscript shall be set in a manuscript feeder, as a matter of course.

If it is determined to be YES the procedure goes to Step S903.

In Step S903, the manuscript is read via the feeder. Read-in image information is stored into the storage, which the apparatus can access, via storage control means.

After the manuscript is read, display control means processes to display a screen to select whether or not the distributed print is wanted on the user interface. It is displayed, for example, on the control panel as shown in FIG. 10.

Figure 10:
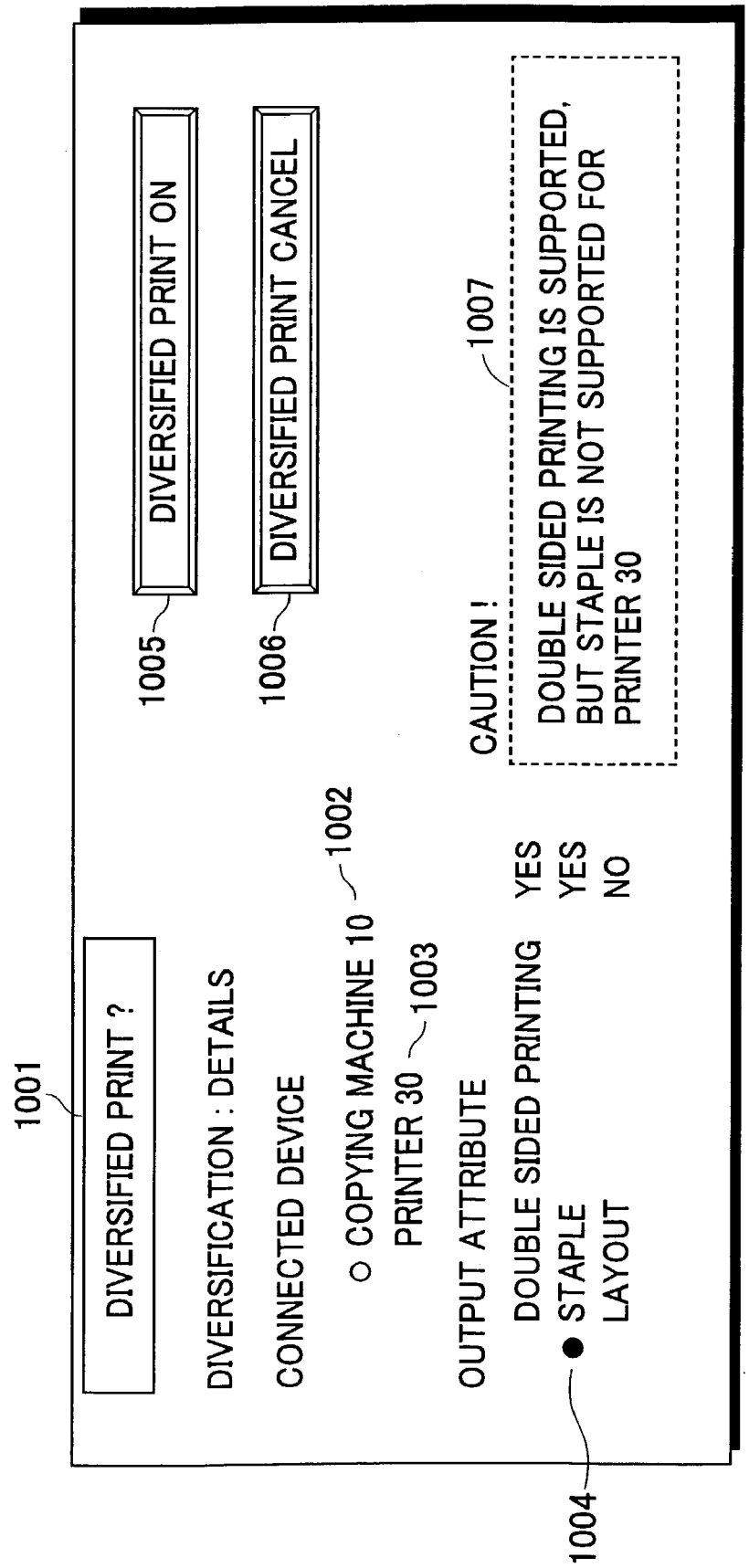
FIG. 10 is an example of display of an operator interface displayed on a control panel of the image output apparatus.

Referring now to FIG. 10, reference numeral 1001 shows a message inquiring the operator whether or not the distributed print is wanted displayed on the control panel 13 of the copying machine 10.

Reference numerals 1002 and 1003 show an image output apparatus that can be connected currently. It may be the apparatus that is preset, or the apparatus based on the result of searching a device to be connected to the apparatus via the network at a predetermined timing. A circle associated to the copying machine 10 designated by the numeral 1002 represents the apparatus that is currently operated by the operator.

Reference numeral 1004 designates details of setting (printing attribute) entered in Step S901. The figure shows that the printer does not support the setting of stapling, and shows a massage for identifying the attribute which is supported and the attributes which is not supported when the distributed print is carried out using the image output apparatus to be connected. Reference numeral 1004 shows that the output attribute which is not supported is marked with a black circle for notifying it to the operator.

Reference numerals 1005 and 1006 show buttons for deciding whether or not the operator performs distributed print. When the button 1006 is selected, the distributed print is not performed and the output processing is executed only by the apparatus. According to the flow chart shown in FIG. 9, if the answer is No in Step S904, the procedure goes to S202 in FIG. 4 and S302 in FIG. 6 in Step S912, and the process described in conjunction with the preceding embodiments is executed. By executing Step S912, in the case where the printer 30, which is an image output apparatus connected externally of the apparatus in question is remotely located, alternate output by the printer 30 may be prevented.

On the other hand, when the answer is YES in Step S904, the time required for the apparatus to migrate to the stand-by state is calculated in Step S905 in order to decide the output method according to the power feeding state of the output unit in the apparatus and the power feeding state of the output unit of the printer 30.

The stand-by state corresponds to the waiting mode described above in conjunction with the preceding embodiments, and the time required to migrate to the waiting mode, or the time required for the copying machine to warm up the fixing unit sufficiently for printing, is calculated. In this embodiment, for the sake of clarification of description, it is assumed that the printer 30 employs an on-demand fixing system including a linear heating body which requires only several seconds (for example, 0.5 second to 9 seconds) for migrating to the waiting mode and that the printer 30 requires substantially zero second for migrating to the waiting mode.

A characteristic of Step S905 is that calculation is executed based on the detected results of the respective sensors integrated in the mainframe of the apparatus. This is achieved by providing such construction that the mainframe of the apparatus can utilize the tables shown in FIG. 3, which is described in conjunction with the first embodiment. The sensor may include, for example, a temperature sensor, a humidity sensor, and a voltage sensor. The time required for migrating to the waiting mode based on the detected results of environmental information detected by the various sensors including the temperature sensor is as described in the first to the third embodiments. In Step S905, the time required for migrating to the waiting mode according to variations in input voltage from the commercial power source is calculated on a real-time basis. In this calculating job, the fact that the input voltage varies to lower values when many pieces of equipment use the commercial power source during daytime, whereby a power supplied to the image output apparatus is lowered, and the heat quantity for warming up the fixing unit decreases as a consequence is taken into account.

In Step S906, remaining output information such as the number of sheets/sets to be printed by the stand-by time calculated in Step S905 and the remaining number of sheets/sets to be printed by the printer 30 is calculated.

In Step S907, information on distribution indicating how to distribute the number of pages/sets for distributed print between the copying machine 10 and the printer 30 is determined based on the remaining output information calculated in Step S906. By the steps from Step S905 to S907, the proportion of output distribution between the apparatus and the external output apparatus is determined with the migration time to the waiting mode of the apparatus and of the external apparatus taken into account. In addition, from Step S905 to S907, the proportion of distribution with the output speed of the apparatus and of the external apparatus taken into account is determined.

In Step S908, printing data to be allocated to the copying machine 10 and the printer 30 is produced and transmitted via the cable/network based on distribution information determined in Step S907. Since image information (printing data) of the manuscript read by the feeder is stored in the storage of the apparatus for all the pages in advance, desired printing data may be produced for desired distribution information determined in Step S908. The image information to be transmitted may be in the form of a page description language suited to the printer 30 that is a destination of image information, or may be in the form of general data such as image data.

Since printing data transmitted in Step S908 is based on the image read by the manuscript feeder provided in the copying machine 10, printing data is not transmitted to the copying machine 10.

In Step S909, whether or not the copying machine 10 itself has migrated to the waiting mode is determined. If YES the process goes to Step S910, and if NO, the process goes to Step S905. When the procedure went to Step S905, the time required for migrating to the waiting mode, which may vary due to the input voltage or the like, is calculated again. If there is any change, the changed values are calculated also in Steps S906, S907 and S908 correspondingly. When there was any change in Step S908 such as addition of printing data to be transmitted to the printer 30, the additional data is transmitted to the printer 30 together with information on the range of pages/number of sets to be printed. While if there is deletion of the range of pages/ number of sets to be printed out, only information on the printing range indicating new range of pages/number of sets is transmitted to the printer, and useless printing data is prevented from being transmitted before execution.

An example of arithmetic expression will be shown below.

$n = PPM30 \times t$ $RP = \text{Total Page numbers} - n$ $EP = (PPM30/PPM10 + PPM30) \times RP + n$ $BP = EP + 1$, where t: time required for migrating to the waiting mode (minutes)
n: No. of pages to be output by the printer 30 before migration to the waiting mode
RP: remaining pages
EP: last page to be printed by the printer 30
BP: first page to be printed by the copying machine
PPM30: No. of pages to be printed by the printer 30 per minute In Step S910, the printing jobs in accordance with Steps S901 to S909 described above are executed in the copying machine 10 and the printer 30.

In Step S911, display of distribution history and printing job are executed in the copying machine 10 and the printer 30, respectively, and thus the operator may easily know the distribution history at either of printing machine.

Although the time required for the printer 30 to return to the waiting mode is assumed to be substantially zero in the description above, when a certain time period is required for the printer 30 to migrate to the waiting mode, the difference between the time t1 and t2 (t1>t2) required for the copying machine 10 and the printer 30 to migrate to the waiting mode must simply be substituted in "t" in the expression.

The difference may be utilized for making the printer 30 notify the copying machine 10 of a timing that the printer 30 has migrated to the waiting mode, or for allowing the copying machine 10 to use the results sensed by various sensors in the printer 30 or the table of the printer 30 shown in FIG. 3.

In this manner, according to the fourth embodiment, the distribution output in accordance with the states of the copying machine 10 and the printer 30 adequately.

[Fifth Embodiment]

In the fifth embodiment, a mechanism having a further developed function in addition to the functions in the first to fourth embodiments will be described. The basic hardware constructions in the copying machine, the printer, the printing job management apparatus, and the image output apparatus are the same as the preceding embodiments.

Figure 11:
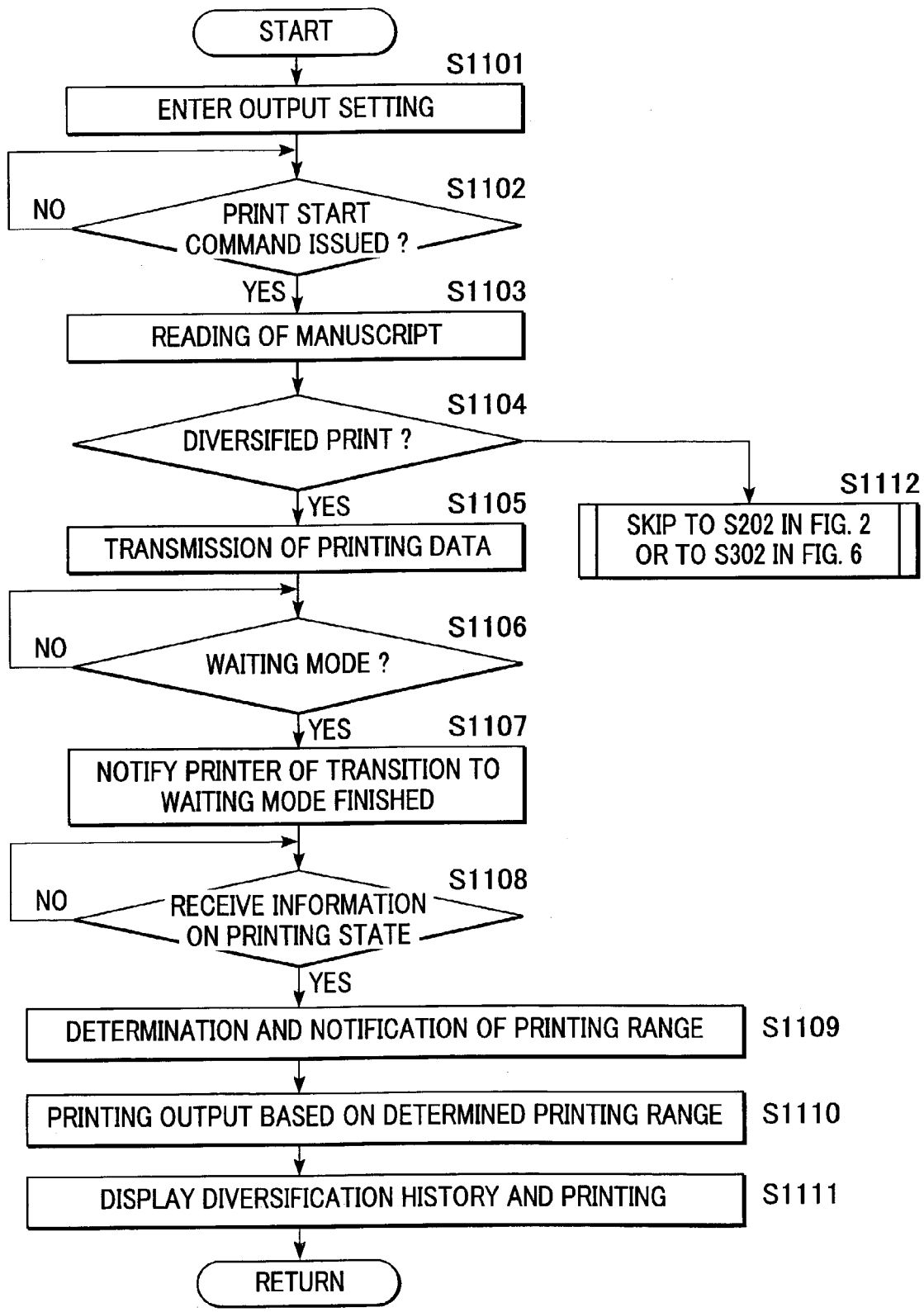
FIG. 11 is a flow chart showing an example of the data processing procedure of the image output apparatus according to the invention.

FIG. 11 is a flow chart showing a process in the apparatus to which printing data is entered, which is achieved by the CPU (Central Processing Unit) provided in the apparatus by performing a process based on the program stored in non-volatile storage means (such as a hard disk or the ROM). The system construction is the same as in the fourth embodiment.

Steps S1101 to S1104 are the same as those in the fourth embodiment, detailed descriptions are omitted.

If the answer is YES in Step S1104, printing data based on the image read in Step S1104 is transmitted to the printer 30 in Step S1105. The image information transmitted in Step S1105 may be in the form of a page description language suited to the printer 30 that is a destination of image information, or may be in the form of general data such as image data.

On the other hand, when the answer is NO in Step S1104, the procedure goes to Step S1112. Since the step S1112 has the same process and effects as Step S912, which is already described in conjunction with the fourth embodiment, detailed description are omitted.

In Step S1105, same printing data as printing data to be transmitted is stored in the non-volatile storage means such as the hard disk of the apparatus. At this moment, the printer 30 received printing data is executing the printing job sequentially.

In Step S1106, whether or not the apparatus has migrated to the waiting mode is determined, and if YES information indicating that it has migrated to the waiting mode is informed to the printer 30 via the cable or the network in Step S1107. The apparatus (printer 30) that received such information in Step S1107 returns information on the range of pages/number of sets that the apparatus (printer 30) has printed, or on the printed state out of the range of pages/ number of sets that will be printed after a predetermined time period has elapsed to the original apparatus that transmitted information in Step S1107.

In Step S1108, whether or not the original apparatus received printing state information from the printer 30 is determined. If YES the procedure goes to Step S1109.

In Step S1109, the apparatus determines the printing range such as the range of pages/number of sets to be printed by the apparatus based on printing state information received from the printer 30 in Step S1108, and returns the determined printing range information to the original apparatus (printer 30) that transmitted such information in Step S1108.

The apparatus (printer 30) that received such information in Step S1109 recognizes the last page No./No. of sets to be printed based on received information, and executes printing job based on the recognition. For example, when the printer 30 has already printed 40 pages out of 100 pages for one set, the printer that received information indicating that the pages ranged from 71 to 100 are to be printed by the copying machine 10 calculates and determines that the last page number to be printed is 75 page.

In Step S1110, the apparatus executes the printing job according to the printing range determined in Step S1109.

In Step S1111, the distribution history is displayed and the printing job is executed in each image output apparatus. The timing of execution of the process in Step S1111 in each image output apparatus shall be the timing when the respective apparatus completed printing of the range of pages/ number of sets based on the Step S1109.

Describing Steps S1108 and S1109 in detail, for example, when the printer 30 has started the printing job of 100 pages from the first page, and now has printed until 40 page (already discharged) at the timing when the fixing unit of the copying machine 10 is warmed up and is just to migrate to the waiting mode, the printer prints the remaining pages from 41 to 70 page and allows the coping machine 10 to print from 71 page to 100 page. The proportion of printing speed between the copying machine 10 and the printer 30 is 1:1.

An example of expression will be shown below.

$$EP=[(PPM30/PPM30+PPM10)\times(\text{total page number}-n)]+n,$$

where

EP: last page to be printed in the printer 30
PPM30: number of pages printed per minute in printer 30
PPM10: number of pages printed per minute in the copying machine 10
n: range of pages already printed in the printer 30

$$BP=EP+1$$

PB: page to start printing in the copying machine 10

As described thus far, in contrast to the process of the flow chart shown in FIG. 9, the flow chart shown in FIG. 11 eliminates a necessity to decide the range of pages to be printed by each image output apparatus from the beginning, and a necessity to calculate the time required for migration to the waiting mode, which may be varied dynamically depending on the temperature, the humidity, the input voltage supplied from the commercial power source. Therefore, the load of process in the image output apparatus may be alleviated, and the image output apparatus under energy saving may be effectively utilized while promoting power saving of the image output apparatus. As a consequence, a mechanism that can output the printed sheets quickly while promoting energy saving may be realized.

Referring now to a memory map shown in FIG. 12, a construction of the data processing program that may be read out by the printing system to which the image output apparatus and the device management apparatus according to the invention may be applied will be described.

FIG. 12 is an explanatory drawing illustrating a memory map of the storage medium for storing various data processing programs that can be read by the printing system to which the image output apparatus and the device management apparatus according to the invention may be applied.

Though it is not shown in the figure, information for managing a group of programs to be stored in the storage medium, for example, version information and a creator is also stored, and information depending on the OS on the side of the program reader, such as icons for identifying and representing the programs may also be stored.

In addition, data belonging to various programs is managed by the directory described above. There also may be the case in which a program for installing various programs on the computer or an uncompressing program to be used when the program to be installed is compressed is stored.

The functions according to the embodiments shown in FIG. 4, FIG. 6 and FIG. 8 may be performed by the host computer by the program to be installed from the outside. In such a case, the invention may also be applied when a group of information including the programs is supplied to the output apparatus from the storage medium such as a CD-ROM, a flash memory, or the FD, or from the external storage medium via the network.

As described above, it is needless to say that the object of the invention is achieved by supplying the storage medium with a program code of the software for achieving the functions of the embodiments described above stored therein to the system or to the apparatus, and reading and executing the program code stored in the storage medium by the computer (or CPU, or MPU) of the system or of the apparatus.

In this case, the novel function of the invention is achieved by the program code itself read out from the storage medium, and thus the storage medium with such program code stored therein constitutes the invention.

A storage medium for supplying the program code may be a flexible disk, a hard disk, an optical disk, a magnetic optical disk, a CD-ROM, a CD-R, a magnetic tape, a non-volatile memory card, ROM, EEPROM and so on.

It is needless to say that the invention includes not only the case in which the functions described in conjunction with the embodiments are achieved by executing the program code that is read out by the computer, but also the case in which the functions described in conjunction with the embodiments are achieved by executing the actual processing in part or entirely by the OS (Operating System) working on the computer based on the instructions indicated by the program code.

In addition, it is needless to say that the invention includes the case in which the functions described in conjunction with the preceding embodiments are achieved by writing the program code read from the storage medium into an expanded board inserted into the computer or on an expanded unit connected to the computer, and then executing the actual processing in part of entirely by the CPU or the like provided in the expanded board or the expanded unit based on the instruction of the program code.

As described thus far, the invention provides a mechanism for controlling effective output of image information supplied from the image input unit such as the feeder under the environment in which power saving is achieved.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image output apparatus including an image reader for reading an image of a manuscript and being connected to an external image output apparatus, comprising:
    an output unit operable to output the image of a manuscript read by the image reader; and
    a determination unit operable to determine an output method based on a power supply state of an output unit of the external image output apparatus and a power supply state of the output unit of the image output apparatus in response to an image output request for the image of the manuscript read by the image reader made by an operator,
    wherein at least one of the output units output the image according to the output method.

2. The image output apparatus according to claim 1, wherein the output method includes a distributed print, and the determination unit determines a proportion of output distribution between the image output apparatus and the external image output apparatus according to a migration time to a waiting mode of the image output apparatus and of the external image output apparatus.

3. The image output apparatus according to claim 2, further comprising:
    a calculating unit operable to calculate the migrating time to the waiting mode based on environmental information including at least one temperature.

4. The image output apparatus according to claim 3, wherein the calculating unit calculates the migrating time to the waiting mode based on at least one input voltage.

5. The image output apparatus according to claim 2, further comprising:
    a display control unit operable to provide a display for indicating an execution of the distributed print by the operator, the display control unit displaying a warning based on attributes of a setting of a printing job.

6. The image output apparatus according to claim 5, wherein the warning identifies an attribute that is not supported by the image output apparatus or by the external image output apparatus.

7. The image output apparatus according to claim 1, wherein the output method includes a distributed print, and the determination unit determines a proportion of output distribution between the image output apparatus and the external image output apparatus based on printing state information obtained from the external image output apparatus.

8. The image output apparatus according to claim 7, further comprising:
    a receiver unit operable to receive the printing state information,
    wherein the printing state information is provided by the external image output apparatus in response to a provision of information indicating that the image output apparatus has migrated to a waiting mode.

9. The image output apparatus according to claim 8, further comprising:
    a display control unit operable to provide a display for indicating an execution of the distributed print by the operator, displaying a warning based on attributes of the setting of printing job.

10. The image output apparatus according to claim 9, wherein the warning identifies an attribute that is not supported by the image output apparatus or by the external output image apparatus.

11. The image output apparatus according to claim 10, wherein the output unit outputs a printing history based on the output method determined by the determination unit, and the external image output apparatus outputs a printing history based on the output method determined by the determination unit.

12. An image output method for an image output apparatus that includes an image reader for reading an image of a manuscript and is connected to an external image output apparatus, said method comprising:
    storing the image of the manuscript read by the image reader;
    determining an output method based on a power supply state of an output unit of the external image output apparatus and a power supply state of the output unit of the image output apparatus in response an image output request for the image of the manuscript read by the image reader made by an operator; and
    outputting the image according to the output method.

13. A computer-executable control program stored in a computer-readable medium for an image output apparatus including an image reader for reading an image of a manuscript and being connected to an external image output apparatus, comprising:
    computer code for storing the image of the manuscript read by the image reader;
    computer code for determining an output method based on a power supply state of an output unit of the external image output apparatus and a power supply state of the output unit of the image output apparatus in response an image output request for the image of the manuscript read by the image reader made by an operator; and
    computer code for executing an output according to the output method.

14. A computer-readable medium for storing a computer-executable control program to be executed by an image output apparatus including an image reader for reading an image of a manuscript and being connected to an external image output apparatus comprising:
    computer code for storing the image of the manuscript read by the image reader;
    computer code for determining an output method based on a power supply state of an output unit of the external image output apparatus and a power supply state of the output unit of the image output apparatus in response to an image output request for the image of the manuscript read by the image reader made by an operator; and
    computer code for executing output according to the output method.

* * * * *

UNITED STATES PATENT AND TRADEMARK OFFICE
CERTIFICATE OF CORRECTION

| | | |
|---|---|---|
| PATENT NO. | : 7,190,472 B2 | |
| APPLICATION NO. | : 10/347930 | |
| DATED | : March 13, 2007 | |
| INVENTOR(S) | : Osamu Watanabe | |

It is certified that error appears in the above-identified patent and that said Letters Patent is hereby corrected as shown below:

ON THE TITLE PAGE [54]:

Title, "THEREFORE" should read --THEREFOR--.

COLUMN 1:

Line 4, "THEREFORE" should read --THEREFOR--; and
Line 15, "therefore." should read --therefor.--.

COLUMN 2:

Line 3, "disposed" should read --disclosed--;
Line 22, "determina-" should read --a determina- --; and
Line 43, "units" should read --unit--.

COLUMN 3:

Line 13, "an" should read --a--; and
Line 64, "dram 120." should read --drum 120.--

COLUMN 6:

Line 28, "finished" should read --finishes--;
Line 30, "operation" should read --operations--;
Line 54, "read" should read --reads--;
Line 57, "determined" should read --determines--; and
Line 62, "determined" should read --determines--.

COLUMN 7:

Line 16, "determined" should read --determines--.

COLUMN 8:

Line 45, "read" should read --reads--.

UNITED STATES PATENT AND TRADEMARK OFFICE
CERTIFICATE OF CORRECTION

| | |
|---|---|
| PATENT NO. | : 7,190,472 B2 |
| APPLICATION NO. | : 10/347930 |
| DATED | : March 13, 2007 |
| INVENTOR(S) | : Osamu Watanabe |

It is certified that error appears in the above-identified patent and that said Letters Patent is hereby corrected as shown below:

<u>COLUMN 9</u>:

Line 20, "returns" should read --and returns--.

<u>COLUMN 10</u>:

Line 8, "sheet" should read --sheets--;
    Line 9, "form" should read --from--;
    Line 23, "such" should read --such as--; and
    Line 57, "above described" should read --above-described--.

<u>COLUMN 11</u>:

Line 37, "coping" should read --copying--.

<u>COLUMN 12</u>:

Line 12, "massage" should read --message--; and
    Line 13, "attributes" should read --attribute--.

<u>COLUMN 15</u>:

Line 38, "coping" should read --copying--.

<u>COLUMN 16</u>:

Line 63, "of entirely" should read --or entirely--.

UNITED STATES PATENT AND TRADEMARK OFFICE
CERTIFICATE OF CORRECTION

PATENT NO. : 7,190,472 B2
APPLICATION NO. : 10/347930
DATED : March 13, 2007
INVENTOR(S) : Osamu Watanabe It is certified that error appears in the above-identified patent and that said Letters Patent is hereby corrected as shown below:

<u>COLUMN 18</u>:

Line 28, "response" should read --response to--; and
Line 43, "response" should read --response to--.

Signed and Sealed this

Third Day of June, 2008

JON W. DUDAS
*Director of the United States Patent and Trademark Office*